United States Patent [19]

Baker et al.

[11] Patent Number: 5,165,756
[45] Date of Patent: Nov. 24, 1992

[54] TUBULAR SEAT BACK FRAME WITH U-SHAPED CLOSED SECTION REINFORCEMENT WELD PLATE

[75] Inventors: Dennis R. Baker, Northville; Dennis E. Cherry, Ypsilanti; Richard D. Stiennon, Southfield, all of Mich.

[73] Assignee: Hoover Universal, Inc., Plymouth, Mich.

[21] Appl. No.: 791,132

[22] Filed: Nov. 13, 1991

[51] Int. Cl.⁵ .......................... A47C 1/12; B60N 2/02
[52] U.S. Cl. ..................................... 297/452; 297/355
[58] Field of Search ..................... 297/452, 353–355, 297/378, 380, 450, 454, 455, 456, 457, 460

[56] References Cited

U.S. PATENT DOCUMENTS

| | | | |
|---|---|---|---|
| 3,469,883 | 9/1969 | Flint | 297/353 |
| 4,575,153 | 3/1986 | Aoki et al. | 297/354 X |
| 4,695,097 | 9/1987 | Muraishi | 297/452 |
| 4,715,653 | 12/1987 | Hattori et al. | 297/460 X |
| 4,804,225 | 2/1989 | Fourrey et al. | 297/354 X |
| 4,863,219 | 9/1989 | Ochiai | 297/355 X |
| 4,919,486 | 4/1990 | Chinomi et al. | 297/354 X |
| 5,013,089 | 5/1991 | Isa et al. | 297/452 |
| 5,040,848 | 8/1991 | Irie et al. | 297/452 |

FOREIGN PATENT DOCUMENTS 3023084  1/1981  Fed. Rep. of Germany ...... 297/354

*Primary Examiner*—Kenneth J. Dorner
*Assistant Examiner*—James M. Gardner
*Attorney, Agent, or Firm*—Harness, Dickey & Pierce

[57] ABSTRACT

A seat back frame is disclosed which includes a tube member bent to form a generally rectangular frame member having first and second upright sides with generally parallel top and bottom ends with the ends being shorter in length than the upright sides. The tube ends are abutting one another and are welded together to close the frame member at the top end. A pivot member is coupled to the frame member adjacent a corner formed by one of the upright sides and the bottom end forming a first pivot for rotatably mounting the seat back frame to a lower seat cushion. An elongated weld plate is fixed to the other upright side of the frame member and extends in length more than half the length of the first upright side. The weld plate is U-shaped in cross section with the tubular upright side of the frame member being disposed in the open end of the U-shaped cross section and being welded thereto at several locations. The lower end of the weld plate is formed with a reinforcement to form an attachment for a recliner sector arm that is a part of the recliner mechanism of the seat assembly for holding the seat back in place. The weld plate together with the tubular frame member forms a close cross-sectional body that is capable of withstanding both bending loads and torsional loads applied when a seat occupant leans rearward into the seat back with the load being resisted by the recliner mechanism at one side of the seat back.

6 Claims, 3 Drawing Sheets

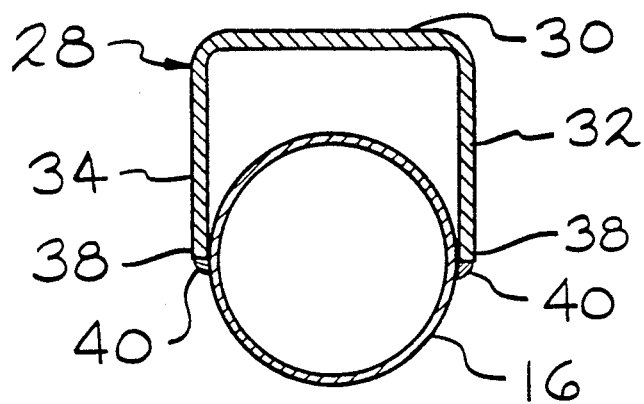
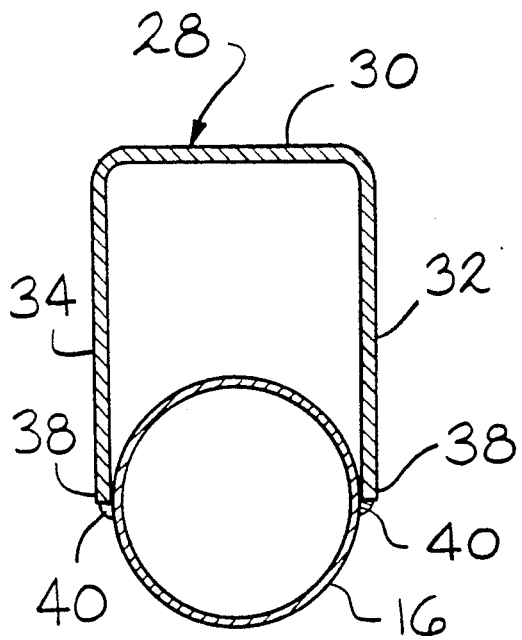
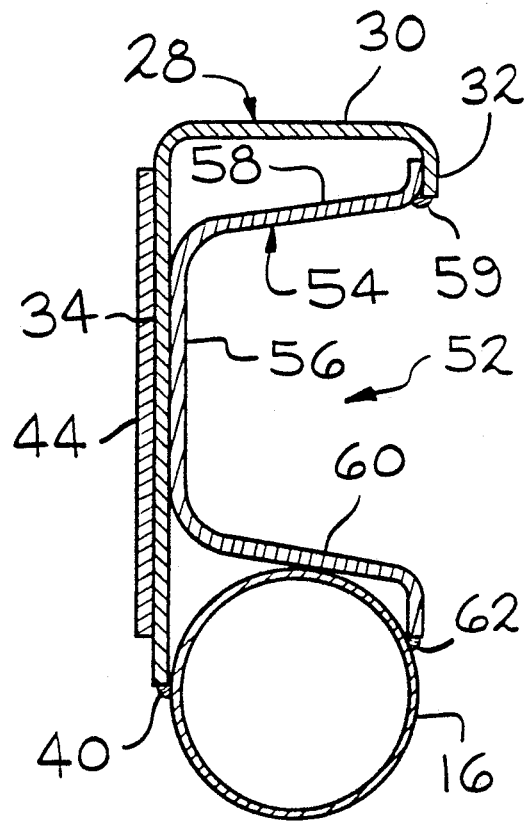

TUBULAR SEAT BACK FRAME WITH U-SHAPED CLOSED SECTION REINFORCEMENT WELD PLATE

BACKGROUND AND SUMMARY OF THE INVENTION

The present invention relates to a vehicle seat back frame and in particular to a seat back frame that is reinforced along one side of the frame with a weld plate framing closed cross-section.

The seat back frame in a motor vehicle seat assembly receives its most severe loading when a seat occupant attempts to reach into a rear pocket and, in so doing, leans rearward against the seat back, generally toward one side. With many reclining seat backs, the recliner mechanism is provided at one side of the seat back and carries all of the load applied to the seat back frame. When a seat occupant leans back in the seat, this load results in both a application of a bending load on a seat back frame and also, due to the lateral offset between where the load is applied and the side of the seat back frame with the recliner, a torsional load is produced in the seat back frame. Seat back frames have been strengthened by the addition of a reinforcing plate fastened along one or both upright sides of the seat back frame. However, such plates while providing reinforcing against bending, provide little reinforcement against torsion.

Accordingly, it is an objective of the present invention to provide a seat back frame that is reinforced in the region of the seat back recliner to increase the capacity of the seat back frame to accommodate both the bending and the torsional loads.

The seat back frame of the present invention includes a tube member bent to form a four sided frame member having first and second upright sides and generally parallel top and bottom ends with said ends being shorter in length than said upright sides. The tube ends are abutting one another and are welded together to close the frame member. A pivot member is coupled to the frame member adjacent a corner formed by a second upright side and the bottom end, forming a first pivot for rotatably mounting the seat back frame to a lower seat cushion.

An elongated weld plate is fixed to a first upright side of the frame member and extends, in length, more than half the length of the first upright side. The weld plate is U-shaped in cross section with the first upright side of the frame member disposed in the open end of the U-shaped cross section. The weld plate is welded at several locations to the frame member.

The lower end of the weld plate is formed for attachment of a second pivot member to the seat back frame forming a second pivot. The first and second pivots together define a lateral pivot axis for the seat back frame. The second pivot member is a part of a recliner mechanism used to hold the seat back in place.

An advantage of the seat back frame of this invention is that the weld plate together with the tubular frame member forms a closed cross section having significantly improved bending and torsional strength. This is accomplished easily while using a conventional and easily formed tubular seat back frame.

Further objects, features and advantages of the invention will become apparent from a consideration of the following description and the appended claims when taken in connection with the accompanying drawings.

BRIEF DESCRIPTION OF THE DRAWINGS

FIGS. 3, 4 and 5 are sectional views of the seat back frame as seen from substantially the lines 3—3, 4—4 and 5—5 of FIG. 1 respectively.

DETAILED DESCRIPTION OF THE INVENTION

Figure 1:
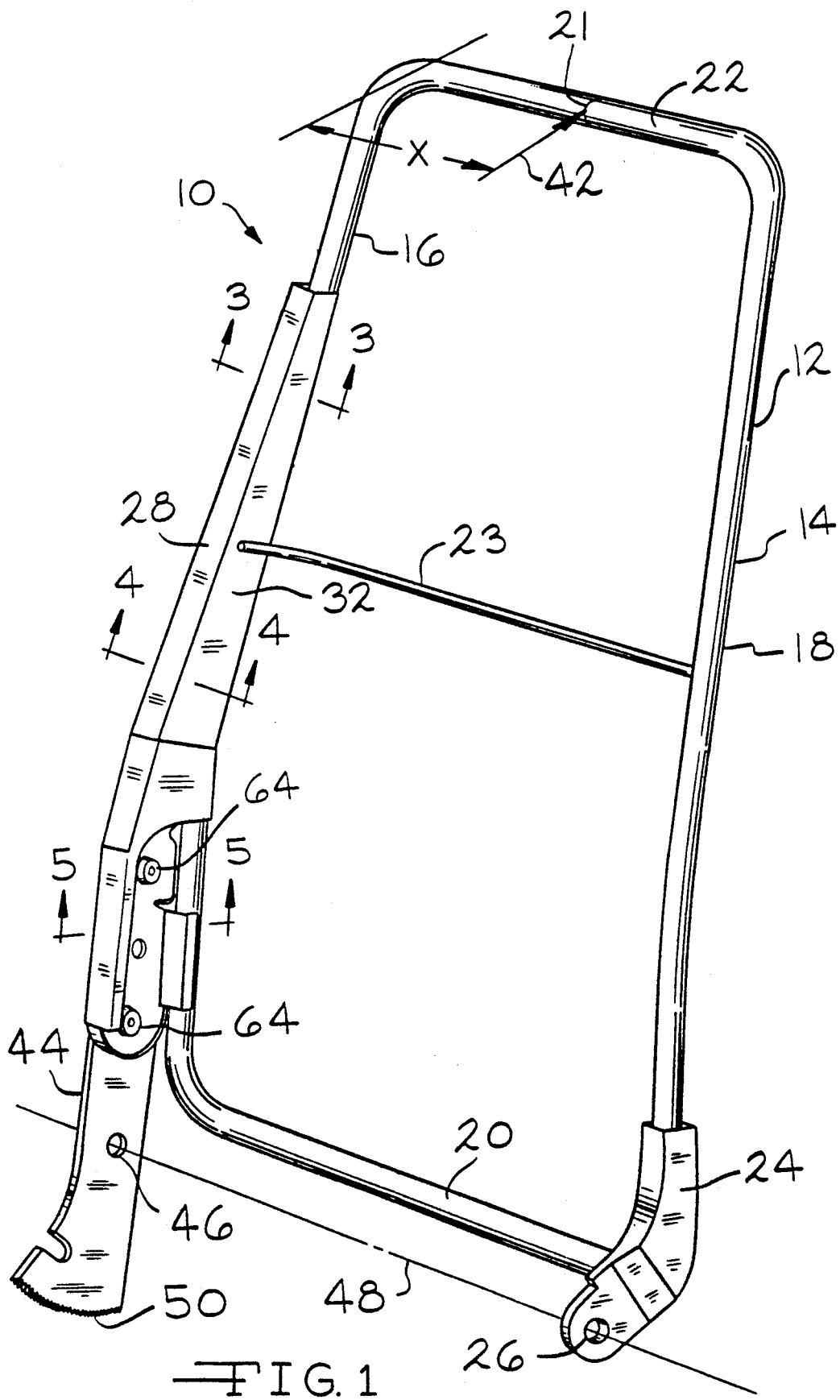
FIG. 1 is a perspective view of the seat back frame of the present invention.
Figure 2:
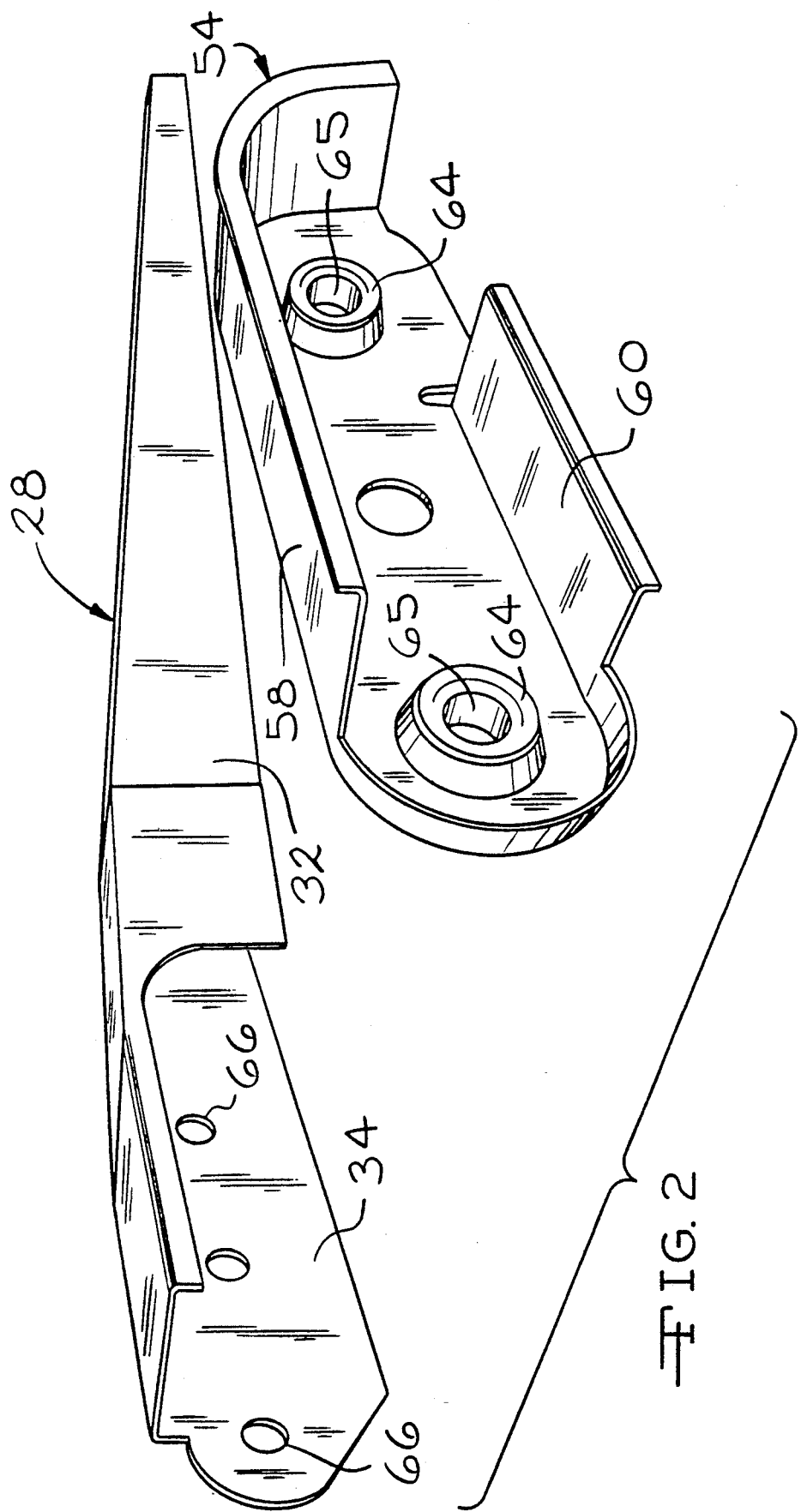
FIG. 2 is an exploded perspective view of the weld plate and a weld plate reinforcement.

The seat back frame of the present invention is shown in FIG. 1 and designated generally at 10. Frame 10 is formed by a tube 12 that has been bent to form a four sided frame member 14. Frame member 14 includes two generally upright side portions 16 and 18 with a shorter bottom end 20 and a top end 22. The ends of the tube are joined together at 21 in the middle of the top end 22 where applied loads are at a minimum. The upright sides and the bottom end of the frame carry most of the loads and is constructed of a single piece tube without any welds adding to the strength of the frame member. A wire 23 extends across the seat back frame between the upright sides 16 and 18 to support seat back springs and padding (not shown).

A pivot member 24 is mounted to the upright side 18 at the lower end. The pivot member 24 extends downwardly below the bottom 20 of frame member 14 and forms an aperture 26 that is used to form one pivot point for the seat back.

A weld plate 28 is fixed to the upright side 16 of the seat frame member 14 and extends lengthwise over a substantial length of the upright side 16, at least over one half of the length, to reinforce the upright side 16. The weld plate is generally U-shaped in cross-section over most of its length as shown in FIGS. 3 and 4. The U-shaped cross-section includes a base wall 30 and two side walls 32 and 34. The width of the U-shaped section, between the side walls 32 and 34 is sized to receive the upright side 16 of the frame member into the interior of the U-shaped section. The edges 38 of the side walls 32 and 34 are welded to the tubular upright side 16 as shown by welds 40 positioned diametrically opposite one another relative to the tube. The welds 40 are intermittently spaced along the length of the weld plate and upright side 16.

The weld plate 28, together with the upright side 16 of the frame member, forms a closed section comprised of the three sides of the weld plate and the tube 12. This closed section provides a reinforcement to the upright side 16 to increase capacity of the upright side 16 to accommodate both bending and torsional loads that are applied when a seat occupant leans back in the seat assembly. Leaning back in the seat applies a force to the seat back frame shown by the arrow 42 in FIG. 1. This force produces a bending load in the upright side 16 as well as a torsional load due to the lateral offset of the force from the upright side 16 shown by the dimension x.

At the lower end of the weld plate, a recliner sector arm 44 is attached and extends downwardly below the bottom end 20. The recliner sector arm forms an aperture 46 to form a second pivot point for the seat back frame. The apertures 26 and 46 together define a lateral axis 48 about which the seat back rotates. The lower edge of the recliner sector arm 44 is formed with a sector gear 50 that engages with a locking pawl of a recliner mechanism (not shown) in a conventional manner to resist rotation of the seat back. The recliner sector arm 44 carries all of the load applied to the seat back to resist seat back rotation.

The frame member 14, constructed of the tube 12, is by itself insufficient to carry the bending and torsional load over the expected life of the seat necessitating the use of some form of a reinforcement for the seat back frame. The U-shaped weld plate 28 provides a significant reinforcement resulting from the closed sectional shape to resist both torsion and bending in an efficient manner, with a minimal use of material. Because the bending load increases toward the bottom of the seat back frame, the U-shaped section is tapered, increasing in depth in a direction from the top toward the bottom of the frame. This is shown clearly in the sectional views 3 and 4 where the length of the side walls 32 and 34 is larger in FIG. 4 as compared to FIG. 3. The taper is used to produce a uniform bending stress in the seat frame along the length of the weld plate 28.

The weld plate, at its lower end, is modified by the removal of a portion of the side wall 32 to create an opening 52 into the interior of the weld plate. A weld plate reinforcement 54 is inserted into the opening 52 and has a back wall 56 that engages the side wall 34 of the weld plate forming a double wall thickness. A top wall 58 extends from the back wall 56 across the weld plate to the opposite side wall 32 where the top wall 58 is welded to the side wall 32 at 59. A bottom wall 60 extends from the other side of the back wall 56, contacting the tube 16 and ultimately being welded to the tube 16 at weld 62. The weld plate reinforcement includes a pair of mounting bosses 64 around apertures 65 that align with apertures 66 in the weld plate side wall 34. The recliner sector arm 44 is attached to the weld plate by bolts (not shown) that extend through the apertures 65 and 66 in the reinforcement 54 and weld plate 28.

Without the opening 52 in the weld plate, the width between the side walls 32 and 34, made adequate mounting of the recliner plate 44 to the seat back frame difficult, if not impossible. The opening 52 overcomes this assembly problem but leaves the weld plate with insufficient strength at the recliner sector arm attachment. In order to provide sufficient strength to the weld plate, the weld plate reinforcement 54 is added which improves the sectional properties at the attachment of the recliner sector arm 44. The weld plate with the reinforcement is torsionally stiff while being configured in a plate like manner for easy mounting of the recliner sector arm 44.

The seat back frame of the present invention provides the economy and benefits of a tube 12 to form the seat back frame while efficiently providing a reinforcement along the side of the seat back frame that carries the loads applied to the seat back. The closed section formed by the seat back frame and the U-shaped weld plate is both strong in bending as well as being torsionally stiff to resist the high loads applied when an occupant leans back in the seat. The result is an efficiently designed seat back frame from a material use standpoint while also producing a seat back frame that can be easily assembled.

It is to be understood that the invention is not limited to the exact construction or method illustrated and described above, but that various changes and modifications may be made without departing from the spirit and scope of the invention as defined in the following claims.

We claim:

1. A frame for a seat back of a vehicle seat assembly, comprising:

a tube member bent to form a four sided frame member having first and second upright sides with generally parallel top and bottom ends with said ends being shorter in length than said upright sides, said tube having ends abutting one another and being joined together to close said frame member;

first pivot means coupled to said tube member adjacent a corner formed by said second upright side and said bottom end forming a first pivot for rotatably mounting the seat back frame to a lower seat cushion frame;

an elongated weld plate fixed to said first upright side of said frame member, said weld plate being U-shaped in cross section having a base wall and first and second side walls extending from edges of said base wall and leading to an open end of said U-shaped cross section, a portion of the length of the first upright side of said frame member being disposed in the open end of the U-shaped cross section and contacting both said first and second side walls and being joined thereto by welds whereby said weld plate and said portion of the length of said first upright side of said frame member form a closed section beam of increased strength compared to said tubular upright side of said frame member; and means at a lower end of said weld plate for reinforcing said weld plate and for attaching second pivot means for rotatably mounting said set back frame to said lower seat cushion frame.

2. The seat back frame as set forth in claim 1 wherein said reinforcing and attaching means includes a reinforcement mounted to said weld plate at an opening in said first side wall, said reinforcement having a back wall parallel to and engaging an inner surface of the second side wall of said weld plate to form a double wall thickness with apertures through said weld plate and reinforcement for mounting of a recliner sector arm to said seat back frame.

3. The seat back frame as set forth in claim 2 wherein said reinforcement includes a top wall extending from said back wall to said weld plate first side wall at a edge of said opening and being welded thereto and a bottom wall extending from said back wall to said tube and being welded thereto.

4. A seat back frame as set forth in claim 1 wherein said U-shaped cross section increases in depth from the top toward the bottom of said weld plate with said base wall being spaced further from said first upright side at the bottom of said weld plate than at the top of said weld plate whereby the size of said closed section increases from the top to the bottom.

5. A seat back frame as set forth in claim 4 wherein the ends of the tube are joined together at the top end of said frame member.

6. The seat back frame as set forth in claim 4 wherein said weld plate length is greater than one half of the length of said second upright side.

* * * * *